(12) United States Patent
Ross et al.

(10) Patent No.: US 11,854,222 B2
(45) Date of Patent: Dec. 26, 2023

(54) DETERMINATION OF RELATIVE POSITION OF AN OBJECT

(71) Applicant: K2R2 LLC, Camarillo, CA (US)

(72) Inventors: Graham Ross, Oceanside, CA (US); Robert L Kay, Thousand Oaks, CA (US)

(*) Notice: Subject to any disclaimer, the term of this patent is extended or adjusted under 35 U.S.C. 154(b) by 0 days.

(21) Appl. No.: 18/097,450

(22) Filed: Jan. 16, 2023

(65) Prior Publication Data

US 2023/0162385 A1 May 25, 2023

Related U.S. Application Data

(63) Continuation of application No. 17/240,718, filed on Apr. 26, 2021, now Pat. No. 11,587,251, which is a continuation of application No. 16/044,321, filed on Jul. 24, 2018, now Pat. No. 11,017,549, which is a continuation of application No. 15/483,626, filed on Apr. 10, 2017, now Pat. No. 10,078,908.

(60) Provisional application No. 62/374,277, filed on Aug. 12, 2016.

(51) Int. Cl.
```
G06T 7/70        (2017.01)
G06T 7/73        (2017.01)
H04N 13/239      (2018.01)
H04N 23/57       (2023.01)
H04N 23/90       (2023.01)
```

(52) U.S. Cl.
CPC .................. *G06T 7/70* (2017.01); *G06T 7/73* (2017.01); *H04N 13/239* (2018.05); *H04N 23/57* (2023.01); *H04N 23/90* (2023.01); *G06T 2207/10012* (2013.01); *G06T 2207/30164* (2013.01); *G06T 2207/30204* (2013.01); *Y10S 901/47* (2013.01)

(58) Field of Classification Search
CPC ... G06T 7/70; G06T 7/73; G06T 2207/10012; G06T 2207/30164; G06T 2207/30204; H04N 13/239; H04N 23/57; H04N 23/90; Y10S 901/47

See application file for complete search history.

(56) References Cited

U.S. PATENT DOCUMENTS

| | | | | |
|---|---|---|---|---|
| 5,828,770 | A  * | 10/1998 | Leis | C12Q 1/6806 382/103 |
| 10,289,111 | B1 * | 5/2019 | Romano | G05D 1/0022 |
| 10,403,050 | B1 * | 9/2019 | Beall | G06T 7/292 |
| 10,929,494 | B2 * | 2/2021 | Chamberlin | G06F 16/9537 |
| 2016/0016312 | A1 * | 1/2016 | Lawrence, III | B25J 9/1697 901/41 |

(Continued)

*Primary Examiner* — Mia M Thomas (57) ABSTRACT

This application describes a method of determining a position and orientation of an object having a plurality of fiducials attached thereto. The method includes the steps of forming images of the plurality of fiducials on a sensitive surface of a sensor and determining a 2D location of each of the images of the plurality of fiducials on the sensitive surface. Information comprising 3D positions of the plurality of fiducials in a coordinate system of the object is then retrieved and each of the 2D locations of the plurality of images is associated with the 3D position of the same fiducial. A position and orientation of the object with respect to the sensitive surface of the sensor is then determined based in part on the 2D locations of the images and the 3D positions of the fiducials.

10 Claims, 6 Drawing Sheets

(56) References Cited

U.S. PATENT DOCUMENTS

| | | | |
|---|---|---|---|
| 2017/0075116 A1* | 3/2017 | Gardiner | G02B 27/017 |
| 2018/0075403 A1* | 3/2018 | Mascorro Medina | B25J 9/1697 |
| 2018/0204307 A1* | 7/2018 | Schied | G06T 1/20 |
| 2019/0202057 A1* | 7/2019 | Smith | G06K 19/0614 |
| 2020/0401158 A1* | 12/2020 | Kitano | G06T 7/73 |
| 2022/0337744 A1* | 10/2022 | McCombe | H04N 23/662 |
| 2023/0043103 A1* | 2/2023 | Pritchett | A61B 5/1127 |

* cited by examiner

DETERMINATION OF RELATIVE POSITION OF AN OBJECT

CROSS-REFERENCE TO RELATED APPLICATIONS

This application claims the benefit of U.S. application Ser. No. 17/240,718, filed Apr. 26, 2021. which claims priority to U.S. application Ser. No. 16/044,321, filed Jul. 24, 2018 and now U.S. Pat. No. 11,017,549, which claims priority to U.S. application Ser. No. 15/483,626, filed Apr. 10, 2017 and now U.S. Pat. No. 10,078,908, which claims priority to U.S. Provisional Application No. 62/374,277, filed Aug. 12, 2016, all of which are incorporated herein by this reference.

STATEMENT REGARDING FEDERALLY SPONSORED RESEARCH OR DEVELOPMENT

Not applicable.

BACKGROUND

Field

The present invention generally relates to determination of relative positions of equipment and fixtures in a workcell.

Description of the Related Art

Robotic workcells commonly use a robot arm to move items between locations, for example between a transport tray and a processing fixture. In current systems, the locations from which the item is picked up and where the item is to be placed must be known precisely by the controller of the robot arm as the robot moves blindly between positions. Set-up of a workcell therefore requires either precision placement of the fixture relative to the robot arm in predetermined positions or calibration of the system after the robot arm and fixture are in place. In either case, the robot arm and the fixture must remain in their calibrated positions or the workcell will no longer function properly.

Methods of determining the position of an object in space by triangulation are known.

Methods of using two cameras to take pictures of the same scene, find parts that match while shifting the two images with respect to each other, identify the shifted amount, also known as the "disparity," at which objects in the image best match, and use the disparity in conjunction with the optical design to calculate the distance from the cameras to the object.

Tracking of a moving object may be improved by use of an active fiducial such as disclosed in U.S. Pat. No. 8,082,064. The sensed position of the fiducial may be used as feedback in a servo control loop to improve the accuracy of positioning a robot arm. Fiducials may be placed on the robot arm and a target object, wherein the sensed positions of the fiducials are used as feedback to continuously guide the arm towards the target object.

SUMMARY

It is desirable to provide a simple method of locating items using a passive camera system and avoid the need for illuminators, scanning lasers, or devices that emit structured light. This improves the simplicity of system, eliminates the need for high-bandwidth communication to a remote processor, and eliminates risks of detection of a vehicle carrying the camera system.

A method of determining a position and orientation of an object having a plurality of fiducials attached thereto is disclosed. The method includes the steps of forming images of the plurality of fiducials on a sensitive surface of a sensor, determining a 2D location of each of the images of the plurality of fiducials on the sensitive surface, associating each 2D location with a 3D position of the same fiducial in a first coordinate system of the object, and determining a first position and a first orientation of the object with respect to the sensitive surface of the sensor based in part on the 2D locations and the 3D positions.

A system for determining a position and orientation of an object having a plurality of fiducials attached thereto is disclosed. The system includes a processor configured to receive images of the plurality of fiducials and a memory. The memory includes instructions that, when loaded into the processor and executed, cause the processor to perform the steps of receiving from a camera system images of a portion of the plurality of fiducials, determining a 2D location of each of the portion the plurality of fiducials based in part on the received images, retrieving information comprising 3D positions of the portion the plurality of fiducials in a first coordinate system of the object, associating each 2D location with the 3D position of the same fiducial, and determining a first position and a first orientation of the object with respect to the sensitive surface of the sensor based in part on the 2D locations and the 3D positions.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

The following description discloses embodiments of a system and method of identifying the location and orientation of a robot arm, tools, fixtures, and other devices in a work cell or other defined volume of space.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As used within this disclosure, the term "light" means electromagnetic energy having a wavelength within the range of 10 nanometers to 1 millimeter. In certain embodiments, this range is preferably 300-1100 nanometers. In certain embodiments, this range is preferably 700-1100 nanometers. In certain embodiments, this range is preferably 2-10 micrometers.

As used within this disclosure, the term "fiducial" means a device or assembly that has two states that can be differentiated by observation. In certain embodiments, the fiducial changes color. In certain embodiments, the fiducial exposes a first surface while in a first state and exposes a second surface while in a second state. In certain embodiments, the fiducial emits a first amount of light while in a first state and emits a second amount of light that is different from the first amount of light while in a second state. In certain embodiments, the fiducial is a light emitter that is "on" in a first state and "off" in a second state. In certain embodiments, the fiducial emits electromagnetic energy at wavelengths within the range of 10 nanometers to 1 millimeter. In certain embodiments, this range is 100 nanometers to 100 micrometers. In certain embodiments, the fiducial emits electromagnetic energy over a defined solid angle.

As used within this disclosure, the term "constant" means a value of a parameter that changes less than an amount that would affect the common function or usage of an object or system associated with the parameter.

Figure 1:
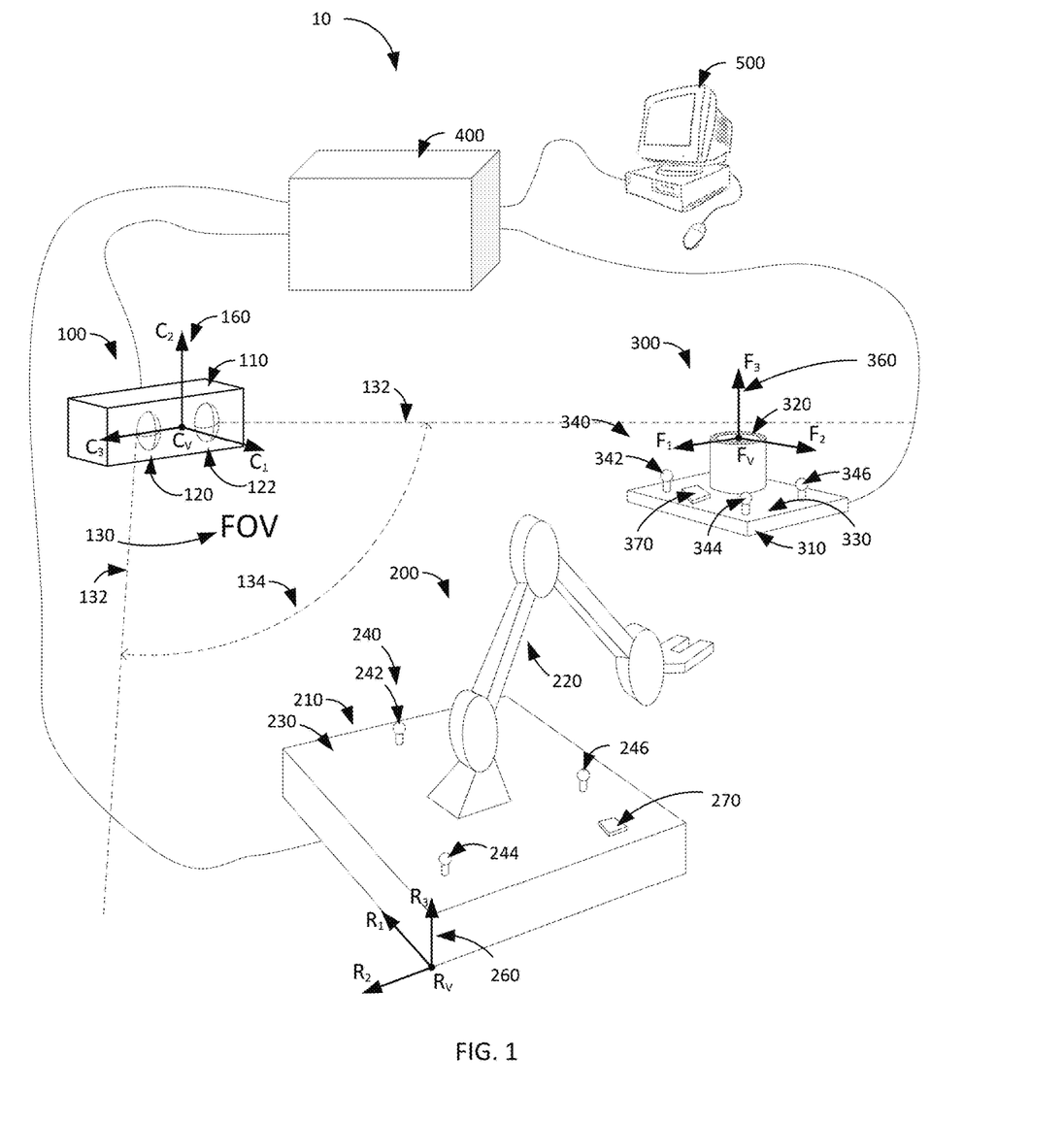
FIG. 1 depicts an exemplary work cell according to certain aspects of the present disclosure.

FIG. 1 depicts an exemplary workcell 10 according to certain aspects of the present disclosure. The workcell 10 comprises a camera module 100, a robot arm module 200, a fixture 300, and an electronics module 400. In certain embodiments, a computer 500 or other remote access system is coupled to the electronics module 400 to provide a user interface. In certain embodiments, the workcell 10 may include a work surface or other support structures that have been omitted from FIG. 1 for clarity.

The camera module 100 has a field of view (FOV) 130 bounded by edges 132 and having an included horizontal angle 134. The FOV 130 has a vertical aspect as well that is not shown in FIG. 1 for sake of simplicity. The camera module 100 has a coordinate system 160 with orthogonal axes C1, C2, and C3. The camera module has two optical systems 120, 122 within enclosure 110. Each of the optical systems 120, 122 has a sensor (not visible in FIG. 1) that is positioned such that images of items within the FOV are formed on the sensors. The position on the sensor of the image of an item within the FOV of the optical system is referred to herein as the position of the item on the sensor. Information about the position of an item comprises one of more of a two-dimensional (2D) location of a centroid of the image on the planar surface of the sensor, the maximum intensity of the image, the total energy of the image, the size of the image in one or more of a width, height, or dimension of a shape such as a circle, or other comparative characteristic of images of a target item, for example an illuminated fiducial, on the sensor. A centroid may be determined an intensity-weighted location or the center of an area determined by the intensity exceeding a threshold.

The information about the position of an item on the sensor of the optical system 120 and the position of the same item on the sensor of the optical system 122 is stored as a position data pair in a memory, for example the memory of camera module 100. This information may be just the 2D location of a feature of the image, for example the centroid, or a multi-pixel color image, or other optical derivatives of the image formed on the sensor.

Each sensor has associated electronics that provide an output containing information about the position of a target item on the sensor. Each optical system 120, 122 has its own FOV wherein the FOV of optical system 122 partially overlaps the FOV of optical system 120 and the overlap of the individual FOVs of the two optical systems 120, 122 form the FOV 130 of the camera module. In certain embodiments, the camera module 100 includes one or more of a processor, a memory, signal and power handling circuits, and communication devices (not shown in FIG. 1). In certain embodiments, the memory contains information about the arrangement of the optical systems 120, 122. This information comprises one or more of the distance between the optical axes (not visible in FIG. 1) of the optical systems 120, 122, the angle between the optical axes of the optical systems 120, 122, the position and orientation of the sensors of the optical systems 120, 122 with respect to the respective optical axes and to the coordinate system 160.

The robot arm module 200 has a base 210 with a top surface 230, an arm 220, and a fiducial set 240 comprising at least three fiducials 242, 244, and 246 mounted on the top surface 230. The robot arm module 200 has a coordinate system 260 with orthogonal axes R1, R2, and R3. In certain embodiments, the robot arm module 200 comprises a processor 270 and may additionally comprise a memory, signal and power handling circuits, and communication devices (not shown in FIG. 1) that are coupled to the processor 270. The processor 270 is communicatively coupled to the processor in camera module 100. In certain embodiments, the memory comprises information about the 3D positions of the fiducial set 240 within the coordinate system 260.

The fixture 300 has a base 310 having a top surface 330, a contact element 320, and a fiducial set 340 comprising at least three fiducials 342, 344, and 346 mounted on the top surface 330. The fixture 300 has a coordinate system 360 with orthogonal axes F1, F2, and F3. In certain embodiments, the fixture 300 comprises a processor 370 and may additionally comprise a memory, signal and power handling circuits, and communication devices (not shown in FIG. 1). The processor of the fixture 300 is communicatively coupled to the processor 370 of camera module 100. In certain embodiments, the memory comprises information about the 3D positions of the fiducial set 340 within the coordinate system 360.

A workcell will have a particular function or process to accomplish. In the example workcell 10 of FIG. 1, the robot arm module 200 will manipulate an object (not shown in FIG. 1) and interact with the fixture 300 to perform an operation on the object. This interaction can only be accomplished if the relative position of the point of interaction on the fixture 300 is known to the processor 270 in the coordinate system 260, which would enable the processor 270 to manipulate the robot arm 22 to position the object at the point of interaction on the fixture 300. In conventional systems, this is accomplished by fixing the fixture 300 in position relative to the robot arm module 200 and precisely determining the point of interaction in the coordinate system 260. This is a lengthy and time-consuming calibration process. If the position of either the robot arm module 200 or the fixture 300 are moved even slightly, the calibration process must be repeated.

In an exemplary embodiment, an operator initiates a "determine configuration" operational mode of the workcell after the workcell is reconfigured to perform a new operation. The processor of the electronics module 400 determines what modules are communicatively coupled to it. The camera module 100 is activated to observe the work area of the workcell 10. The processor of the electronics module 400 retrieves information from the memories of the camera module 100, the robot module 200, and the fixture 300. Based on this information, the processor of the electronics module 400 selects a calibration method and manipulates the camera module 100 and the fiducials of the robot module 200 and the fixture 300 to determine the positions of at least a portion of the fiducials of robot module 200 and fixture 300 in the coordinate system 160.

The processor of the electronics module 400 then determines the positions and orientation of the coordinate systems 260, 360 in coordinate system 160, thus providing a capability to transform, or "map," any position defined in either of coordinate systems 260, 360 into an equivalent position defined in coordinate system 260. The interaction points of the fixture 300, which are retrieved from the memory of fixture 300 and defined in coordinate system 360, are mapped into coordinate system 260. The processor 270 of robot module 200 now has all the information that it needs to move the robot arm 200 to any of the interaction points of fixture 300 without further input from the camera module 100.

Once the configuration of the workcell 10 is known, the workcell can be operated in an "operational mode" to process parts. In certain embodiments, the output of camera module 100 is now turned off and, thus, cannot provide continuous feedback on the absolute or relative positions of the robot arm 200 nor fixture 300. In certain embodiments, the camera module 100 may remain active but workcell 10 is operated without updating the 3D position and orientation of the first module with respect to the second module. Only when the position of one of the modules 200, 300 is detected to be changes, for example by sensing movement using an accelerometer coupled to a module, is the information about the position of the fixture 300 in the coordinate system 260 updated.

In certain embodiments, the camera module 100 comprises a binocular arrangement of the optical systems 120, 122 that enables the determination of the position of any single target item, for example fiducial 342, in three-dimensional (3D) space within the FOV 130 and focal range of the camera module 100. The workcell system 10 is configured to unambiguously identify the target item in each of the images formed on the sensors of the optical systems 120, 122, as is discussed in greater detail with respect to FIG. 4A. Once the positions on the sensors of the optical systems 120, 122 of the target item are known, the 3D position of the target item in the coordinate system 160 can be determined through trigonometry and knowledge of the arrangement of the optical systems 120, 122. Information about the arrangement of the optical systems 120, 122 comprises one or more of the distance between the optical axes, a relative angle between the optical axes, the distance between and relative angle of the sensors, the orientation of the optical axes relative to a mounting base of the enclosure 110, and the position and orientation of one or more components of the camera module 100 relative to the center location and orientation of the coordinate system 160.

For the fixture 300, once the positions of at least two of the fiducials in the fiducial set 340 are known, the orientation of an axis passing through these two fiducials can be determined. This is not sufficient, however, to locate the fixture 300 or, more importantly, the point of interaction of the fixture 300 in coordinate system 160. Additional knowledge of the construction of fixture 300, in particular the positions of the fiducials 342, 344, 346 relative to the point of interaction, must be known.

In certain embodiments, the memory of fixture 300 contains information about the 3D positions of the fiducial set 340 defined within the coordinate system 360. In certain embodiments, one of the fiducials of fiducial set 340 is positioned at the center (0,0,0) of the coordinate system 360 and a second fiducial of fiducial set 340 is positioned along one of the axes F1, F2, and F3. In certain embodiments, the center and orientation of the coordinate system are offset in position and angle from the fiducials of fiducial set 340 and the information about the offsets and angles are contained in the memory of fixture 300.

An exemplary method of determining the position and orientation of the coordinate system 360 within the coordinate system 160 starts by determining the positions in coordinate system 160 of at least two fiducials of fiducial set 340, for example fiducials 342, 344. This provides a point location, for example defined by fiducial 342, and a direction vector, for example defined by the vector from fiducial 342 to fiducial 344. Combined with the information about the positions of fiducials 342, 344 in coordinate system 360, the offset position of the center of coordinate system 360 from the center of coordinate system 160 along the axes C1, C2, C3 and the coordinate transformation matrix describing the rotational offset of the coordinate system 360 around the axes C1, C2, C3 can be calculated.

The information about the positions of fiducials 342, 344 in coordinate system 360 is essential to determining the position and orientation of the coordinate system 360 within the coordinate system 160. In the system 10, the electronics module 400 comprises a processor that is coupled to the optical systems 120, 122 and receives information about the positions of the images of the fiducials on the sensor of each optical system 120, 122. The camera module has a memory that contains information about the arrangement of the optical systems 120, 122. The fixture 300 has a memory that contains information about the 3D positions of the fiducial set 340 defined within the coordinate system 360. The processor of the electronics module 400 is communicatively coupled to the memories of the camera module 100 and the fixture 300 and configured to be able to retrieve the information from both the memories. In certain embodiments, this retrieval is triggered when the system 10 is powered on. After information is retrieved from all connected systems, e.g. the camera module 100, the robot module 200, and the fixture 300 in the example system 10 of FIG. 1, the processor of the electronics module 400 initiates a "position determination" process that includes the steps described above for determining the position and orientation, which can also be expressed as a coordinate transform matrix, of the coordinate system 360 within the coordinate system 160.

Determining the 3D position of each fiducial in coordinate system 160 requires the unambiguous determination of the image of the fiducial on the sensor of each of the optical systems 120, 122. An exemplary means of doing so is to configure the fiducial to emit light in a certain range of wavelengths, for example infrared light, and select a sensor that is sensitive to this same range of wavelengths. Filters can be provided in the optical path of the optical systems 120, 122 to block light outside of this range. If a single fiducial is turned on to emit light, which can be considered a "first state," with all other fiducials turned off, which can be considered a "second state," then a single spot will be illuminated on the sensors of optical systems 120,122.

In certain embodiments, the sensors of optical systems 120, 122 are Position Sensitive Detectors (PSDs) that determine the position of a light spot in the two dimensions of the sensor surface. A PSD determines the position of the centroid of the light spot and its measurement accuracy and resolution is independent of the spot shape and size. The PSD may also provide information related to the maximum brightness of the light spot, the total energy of the bright spot, and one or more aspects of the shape and size of the bright spot. Compared to an imaging detector such as a Charge-Coupled Device (CCD) imager, a PSD has the advantages of fast response, much lower dark current, and lower cost.

In some circumstances, the FOV of camera module 100 may include extraneous sources of light, for example an incandescent light behind the fixture, having a wavelength within the sensitive range of the sensors. An exemplary method of discriminating the fiducial from such extraneous sources is to modulate the frequency of the light emitted by the fiducial. As a PSD is a fast device, modulation frequencies in the hundreds of Hz are feasible and therefore avoid the 50/60 Hz frequency of common light sources as well as unmodulated light emitted by sources such as the sun and thermally hot objects. The output signal of the PSD can be passed through a filter, for example a bandpass filter or a hi-pass filter, that will block light having frequencies outside of the sensitive range of the sensors.

Another exemplary method of determining the 3D position of multiple fiducials in coordinate system 160 is to selectively cause a portion of the fiducials to move to the first state and cause the rest of the fiducials to move to the second state. For example, at least three fiducials in a common fiducial set are turned on, for example fiducials 342, 344, 346 of fiducial set 340, while turning off all other fiducials on that fiducial set as well as all other fiducial sets in the workcell 10 and using an imaging sensor, for example a CCD imager, to capture a 2D image of the FOV of each optical system 120, 122. The two images will respectively have a plurality of first positions on the first sensor and a plurality of second positions on the second sensor. The images are processed to identify the 3D locations of each fiducial that is turned on. If the relative positions of the fiducials 342, 344,346 are known, for example in a local coordinate system, a pattern-matching algorithm can determine the orientation and position of the local coordinate system, relative to the observing coordinate system, that is required to produce images of the three fiducials at the sensed locations on the sensors.

These determined locations of fiducials 342, 344,346 in coordinate system 160 form a 3D pattern that can be matched to a 3D pattern based on the information about the 3D positions of the fiducial set 340 defined within coordinate system 360 that was retrieved from the memory of fixture 300, as the patterns are independent of the coordinate system in which they are defined, provided that the pattern has no symmetry. The result of this matching will be the coordinate transform matrix required to rotate one coordinate system with respect to the other coordinate system so as to match the pattern in coordinate system 160 to the pattern in coordinate system 360.

In certain embodiments, the processor may determine that it is necessary to identify a specific fiducial when multiple fiducials are in the first state. When this occurs, the processor will cause the fiducial to modulate its light in a fashion that can be detected by the sensor. For example, when the sensor is a CCD imager, the fiducial may turn on and off at a rate that is slower than the frame rate of the imager. In another example, where the sensor is a PSD, the processor may synchronize the "on" and "off" states of the fiducial with the reset of the PSD accumulator to maximize difference between "on" and "off" signal strength. Alternately, the fiducial may adjust the intensity of the emitted light between two levels that can be distinguished by the pixel detectors of the CCD sensor. Alternately, the fiducial may adjust the wavelength of the emitted light between two wavelengths that can be distinguished by the pixel detectors of the CCD sensor.

The same methodology used to determine the position and orientation of the coordinate system 360 of the fixture 300 within the coordinate system 160 of the camera module 100 can be then used to determine the position and orientation of the coordinate system 260 of the robot module 200 within the coordinate system 160. The processor of the electronics module 400 retrieves information about the 3D positions of the fiducial set 240 in coordinate system 260 from the memory of the robot module 200. The processor manipulates the fiducials of fiducial set 240 in order to determine the location of each fiducial in the coordinate system 160. The processor then uses the information about the 3D positions of the fiducial set 240 in coordinate system 260 to determine the coordinate transform matrix relating coordinate system 360 to coordinate system 160.

Once the coordinate transformation matrices relating each of the coordinate systems 260 and 360 to coordinate system 160 are determined, it is straightforward to create a coordinate transform matrix that maps positions in the coordinate system 360 of the fixture 300 into the coordinate system 260 of the robot module 200. Any point of interaction with the fixture, for example the location of a receptacle configured to receive a part to be processed, that is included in the information contained in the memory of fixture 300 can be retrieved and converted into coordinate system 260. This data can then be used by the processor that controls the robot arm 220 to place an object in that location.

While the exemplary system 10 described herein associates certain methods and activities with processors of specific modules, the interconnection of the modules enables any function or algorithm to be executed by any processor in the system 10. For example, a portion of the processing of the output of the sensors of optical systems 120, 122 may be performed by a processor within the optical systems 120, 122 themselves, or by a separate processor contained in the enclosure 110 of the camera module 100, or by a processor in the electronics module 400.

The autonomous determination of relative positions of modules greatly simplifies the set-up of a new configuration of workcell 10. An operator simply places the robot module 200 and one or more fixtures 300 within the FOV of camera module 100 and initiates the position determination process. Information about the 3D positions of the fiducial set of each module, defined within the coordinate system of the respective module, is retrieved from the memories of each module. The fiducials are manipulated into various combinations of first and second states, e.g. "on" and "off," and the outputs of the sensors are used to determine the 3D positions of the fiducials in the coordinate system 160. These 3D positions are then used in conjunction with the information about the 3D positions of the fiducials within the various coordinate systems of the modules 300 to map specific locations on the fixtures into the coordinate system of the robot module 200. When this process is complete, the workcell 10 notifies the operator that it is ready for operation.

In certain embodiments, one or more of the modules 200, 300 comprises an accelerometer configured to detect translational or rotational movement of the respective module. For example, motion of a module may be induced by vibration of the work surface or the module during operation, contact between the robot arm 122 and the fixture 300, or an operator bumping into one of the modules. If a module moves, the workcell 10 will stop processing and repeat the position determination process to update the locations on the fixtures within the coordinate system of the robot module 200. In most circumstances, the workcell does not need to physically reset or return to a home position during the position determination process. The robot arm 220 simply stops moving while the position determination process is executed and then resumes operation upon completion.

In certain embodiments, workcell 10 is positioned on a flat work surface (not visible in FIG. 1) that constrains the possible orientations of the various modules relative to the camera module 100. In certain embodiments, it is sufficient to have only two fiducials on a module visible by the optical systems 120, 122.

In certain embodiments, there are 3 or more fiducials in the fiducial set of a module and the processor that is manipulating the fiducials and accepting the information about the positions of the fiducial images from the optical systems 120, 122 is configured to utilize only fiducials that create images on the sensors, i.e. not use fiducials that are hidden from the optical systems 120, 122. As long as a minimum number of the fiducials in the fiducial set are visible to the optical systems 120, 122, the position determination process will be successful. If it is not possible to obtain 3D position information from enough fiducials to determine the position of a module within coordinate system 160, the workcell 10 will notify the operator. In certain embodiments, the modules are configured to detect whether a fiducial is drawing current or emitting light and when a fiducial is not able to move to the first state, e.g. does not turn on, notify the operator of this failure.

In certain embodiments, the camera module comprises multiple intensity detectors that each have an output related to the total energy received over the FOV of that detector. Modulation of a fiducial between "on" and "off" states, and determination of the difference in the total received energy when the fiducial is on and off provides a measure of the energy received from that fiducial. The processor of the electronics module 400 calculates a distance from the camera module 100 to the fiducial based on the ratio of the received energy to the emitted energy and solid geometry. This creates a spherical surface centered at the entrance aperture of the intensity detector. In certain embodiments, the energy emitted by the fiducial and the geometry of the emitted light is part of the information contained in the memory of the module of the fiducial and downloaded with the 3D position information. With three intensity detectors each providing a sphere of possible locations of the fiducial, intersection of the three spheres specifies a point within 3D space where the fiducial is located.

Figure 2A:
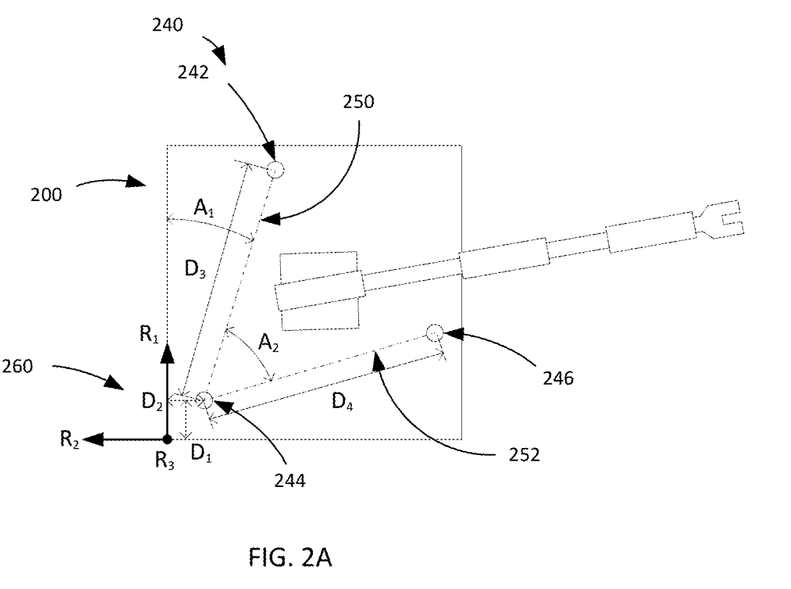
FIGS. 2A-2B depict plan views of the robot module from the work cell of FIG. 1 according to certain aspects of the present disclosure.
Figure 2B:
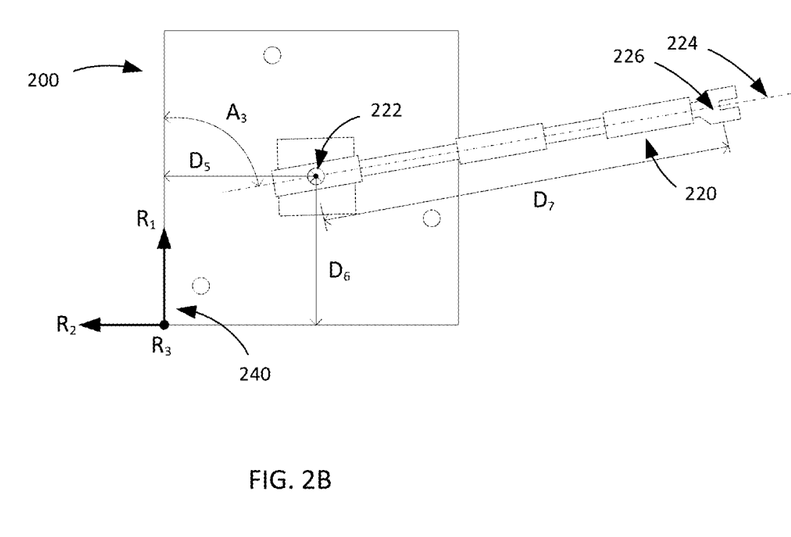

FIGS. 2A-2B depict plan views of the robot module 200 from the work cell of FIG. 1 according to certain aspects of the present disclosure. In this embodiment, fiducial 244 is offset from the origin of coordinate system 240 by distance D1 in the R1 direction and distance D2 in the R2 direction. Fiducial 242 is offset from fiducial 244 by a distance D3 along vector 250 at an angle A1 from axis R1. Fiducial 246 is offset from fiducial 244 by a distance D3 along vector 252 at an angle (A1+A2) from axis R1. The relative position of the fiducials 242, 244, 246 to the origin of coordinate system 260 may be defined in other ways, for example a direct vector from the origin to the fiducial (not shown in FIG. 2A), and the length and angle of that vector. From this information, combined with the positions of some of fiducial set 240 in the coordinate system 160 of the camera module 100, it is possible to determine the position of the origin of coordinate system 260 in coordinate system 160 as well as the directional vectors in coordinate system 160 that are equivalent to directions R1, R2, R3.

FIG. 2B depicts the configuration parameters associated with the robot arm 220 defined in the coordinate system 260. In the embodiment, the robot arm 220 has a first degree of freedom around axis 222, which is parallel to coordinate direction R3. The position of axis 222 is defined by distances D5 and D6 in the R2 and R1 directions, respectively. The angular position of the robot arm 220 is defined an axis 224 that is aligned with the segments of the robot arm 220 and rotated to an angle A3 with respect to direction R1. The position of the gripper 226 with respect to the axis 222 is defined by the distance D7 along axis 224. This information, in conjunction with the knowledge of the position of the origin of coordinate system 260 and the directional vectors that are equivalent to directions R1, R2, R3 of coordinate system 260 in coordinate system 160, enables the position and angle of the gripper 226 to be determined in coordinate system 160. Conversely, any position known in coordinate system 160 can be computed with reference to axis 222 and angle A3.

The benefit of transferring the position of a fixture 300, and points of interaction of fixture 300, into the coordinate system 260 of robot module 200 is to provide the processor 270 with information that enables the processor 270 to move the gripper 226 to the point of interaction of fixture 300. Accomplishing this position determination of the point of interaction of fixture 300 in coordinate system 260 through the use of a an automatic system and process enables the system 10 to function without the modules 200, 300 being fixed to a common structure, thus speeding and simplifying the set-up of the system 10. Once the position of the fixture 300 is known in the coordinate system 260 of the robot module, and the transfer of the additional information regarding the points of interaction of the fixture 300 to the processor 270 and the transformation of the positions of the points of interaction into the coordinate system 260 is completed, the system is ready for operation without a need for the operator to teach or calibrate the system. This is discussed in greater detail with regard to FIGS. 5A-5B.

Figure 3:
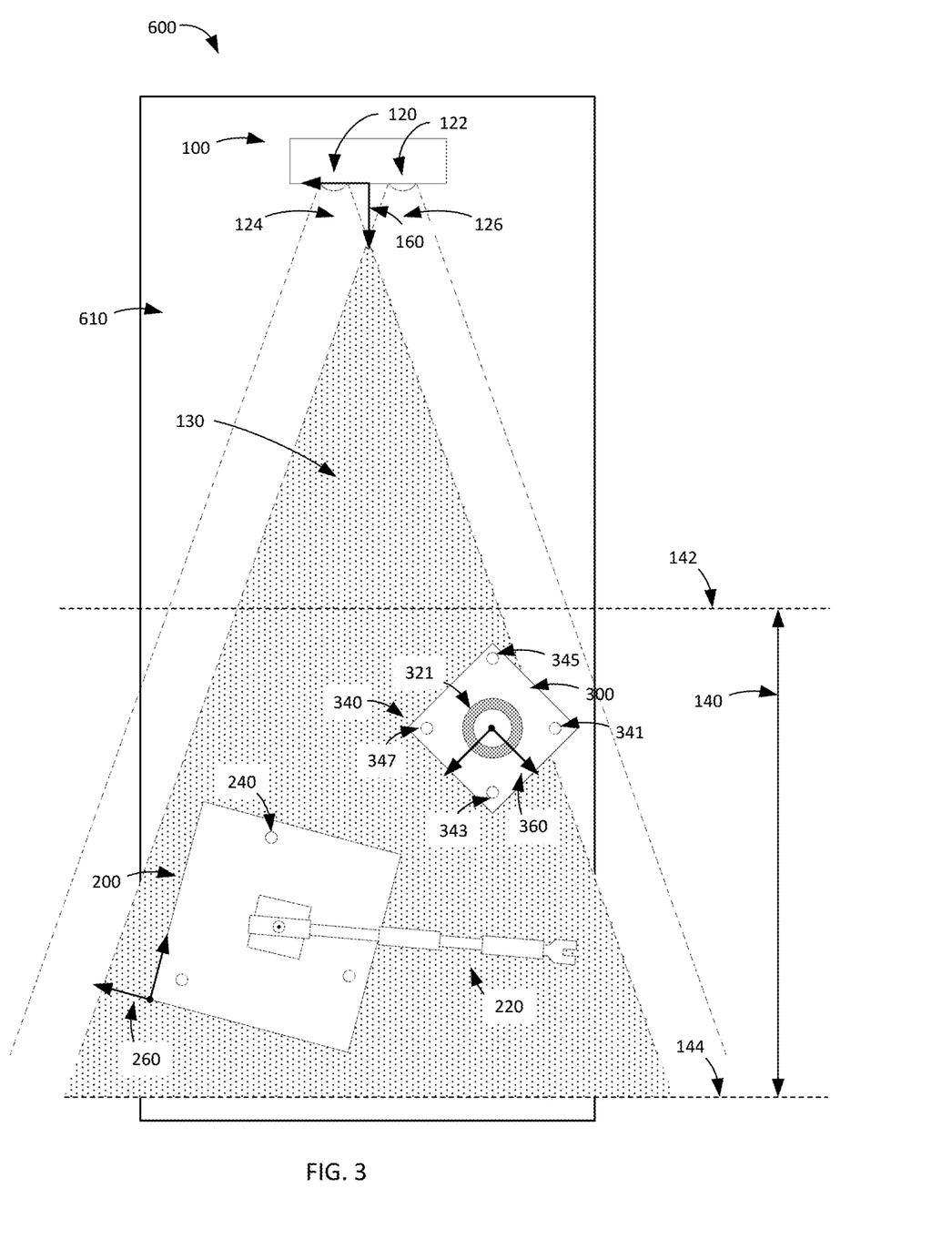
FIG. 3 depicts a plan view of a portion of a workcell according to certain aspects of the present disclosure.

FIG. 3 depicts a plan view of a portion of a workcell 600 according to certain aspects of the present disclosure. The camera module 100, robot module 200, and fixture 300 are positioned on a flat horizontal surface 610. Optical system 120 has a FOV 124 that is delimited by the dashed lines emanating from the curved lens of optical system 120. Optical system 122 has a FOV 126 that is delimited by the dashed lines emanating from the curved lens of optical system 122. The effective FOV 130 is indicated by the shaded region where the FOVs 124, 126 overlap. The work area of the workcell 600 is further defined by the focal range 140 of the optical systems 120, 122, delimited by the minimum focal distance 142 and maximum focal distance 144 from the camera module 100. In certain embodiments, the distances 142, 144 are defined from the center of coordinate system 160. In certain embodiments, the distance 144 may effectively be infinitely far from the camera module 100.

When an operator positions the modules 200, 300 within the FOV 130, one of the fiducials may be outside the FOV. In FIG. 3, fiducial 341 of fiducial set 340 on fixture 300 is outside the shaded area of FOV 130. In addition, fiducial 343 is not visible by optical system 122, being hidden behind the post 321. As long as two fiducials, in this example fiducials 345, 347, are visible to both optical systems 120, 122 then the position of fixture 300 can be determined.

Figure 4A:
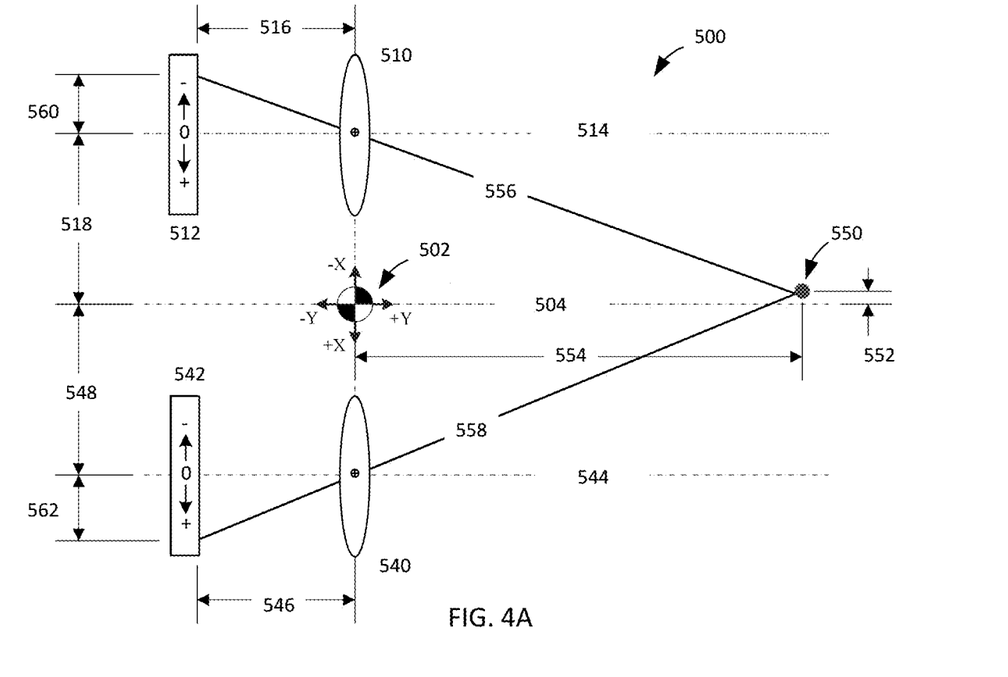
FIGS. 4A-4B depict two exemplary optical designs according to certain aspects of the present disclosure.

FIG. 4A depicts an exemplary optical design according to certain aspects of the present disclosure. In the example binocular system 500, a lens 510 and a sensor 512 are arranged with their centers positioned on an optical axis (OA) 514 and separated by a distance 516 between the sensitive surface of the sensor 512 and the center of the lens 510. Sensor 512 has a polarity indicated by the "+" and "−" signs as to the polarity of the output when a light spot is formed on the upper or lower portions (in this 2D view) of the sensor 512. The set of lens 510 and sensor 520 may be considered as an optical system. This optical system may contain other optical elements, for example additional lenses, reflectors, baffles, stops, and filters, without departing from the concepts disclosed herein. The system 500 also has a second optical system comprising lens 540 and sensor 542 arranged on OA 544 and separated by distance 546. Note that the sensors 512 and 542 have their polarities aligned in the same direction. The system 500 has a center 502 with refence axes Y+, Y−, X+, and X−. In certain embodiments, this center and reference axes correspond to the coordinate system 160 of camera module 100. A system OA 504 passes through the center 502, with the OA 514 separated from the system axis 504 by distance 518 and the OA 544 separated from the system axis 504 by distance 548. All OAs 504, 514, are 544 are parallel and coplanar. When referring to positions, angles, centers, and other aspects of the sensors 512, 542 and similar, it is understood that this is equivalent to the respective aspects of the sensitive surface of the sensor. For example, a center of the sensor is equivalent to the center of the sensitive surface of that same sensor.

A target item 550, for example a fiducial, is positioned within the work area of system 500. Exemplary rays 556 and 558 of light emanate from the target item 550 and respectively pass through the centers of lenses 510, 540 until the ray 556 strikes the sensitive surface of sensor 512 at a distance 560 in the negative direction from the OA 514. The lens 510 and sensor 512 are arranged as a focusing system with a focal range that encompasses the position of target item 550, and therefore other rays emanating from the same point on target item 550 that pass through lens 510 will be refracted onto the same point of impact on the sensor 512. Ray 558 strikes the sensitive surface of sensor 542 at a distance 562 in the positive direction from the OA 544.

In system 500, the absolute values of distances 560, 562 are different by an amount that is proportional to the offset distance 552 of the target item 550 from the system axis 504 but both are still near or at the limits of the sensitive region of sensors 512, 542. As a result, distance 554 is the minimum distance at which a target item is visible in both optical systems and then only when on the system OA 504. Moving the target item further away from the axis 504 will reduce the distance 560 but increase the distance 562 and ray 558 will quickly move off sensor 542 as distance 552 increases. This results in significant portions of the sensors 512, 542 being un-useable and a consequent reduction in the work area of system 500.

Figure 4B:
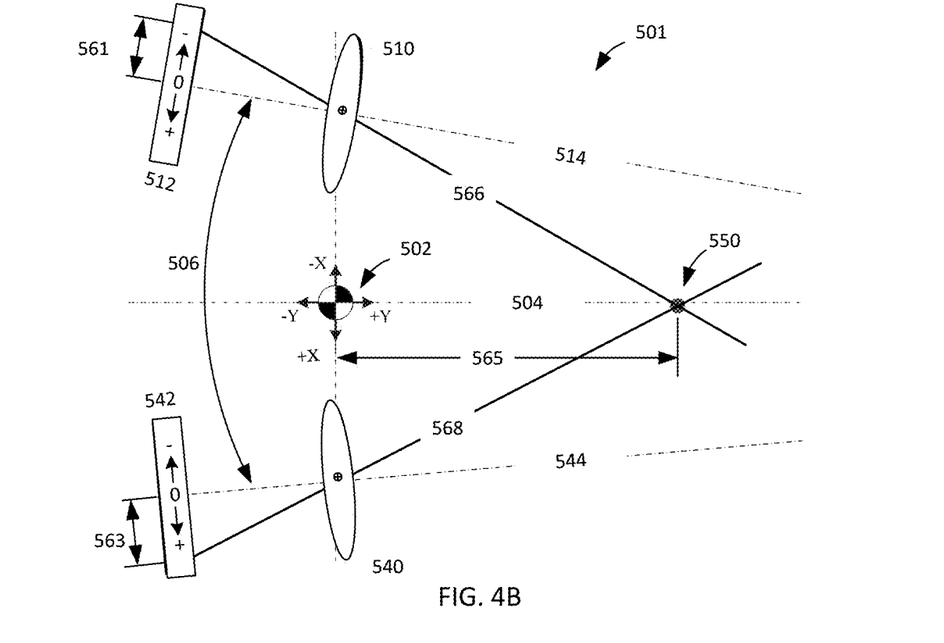

FIG. 4B depicts another exemplary optical design according to certain aspects of the present disclosure. Binocular system 501 is a modification of system 500, wherein the OAs 514, 544 are each rotated toward the system axis 504 and are not parallel to each other. In certain embodiments, the included angle 506 between the two OAs 514, 544 is greater than zero and less than 180 degrees. In certain embodiments, the included angle 506 between the two OAs 514, 544 is in the range of 5-15 degrees. This is contrary to the design rules for optical systems designed for use by humans as the human eye and brain are wired to properly form merged images only when the OAs 514, 544 are parallel. In this example, distances 561, 563 are equal as the target item 550 is now on the system axis 504 and are approximately equal to distance 562 of FIG. 4A, which was the larger of the distances 560, 562. In system 501, the distance 565 from the center 502 to the target item 550 is shorter than distance 554 of system 500, thereby bringing the work area closet to the camera module 100. In certain embodiments, the two OAs 514, 544 pass through the center of the sensitive areas of the respective sensors 512, 542, the sensitive surfaces of which are perpendicular to the OAs 514, 544. As a result, the sensitive surface of sensor 542 is not parallel to the sensitive surface of sensor 512.

The angled OAs 514, 544 increase the total size of the work and make use of a larger portion of the sensitive surfaces of sensors 512, 542. In certain embodiments, the amounts that the axes 514, 544 are rotated toward the system axis 504 are not equal.

Figure 4C:
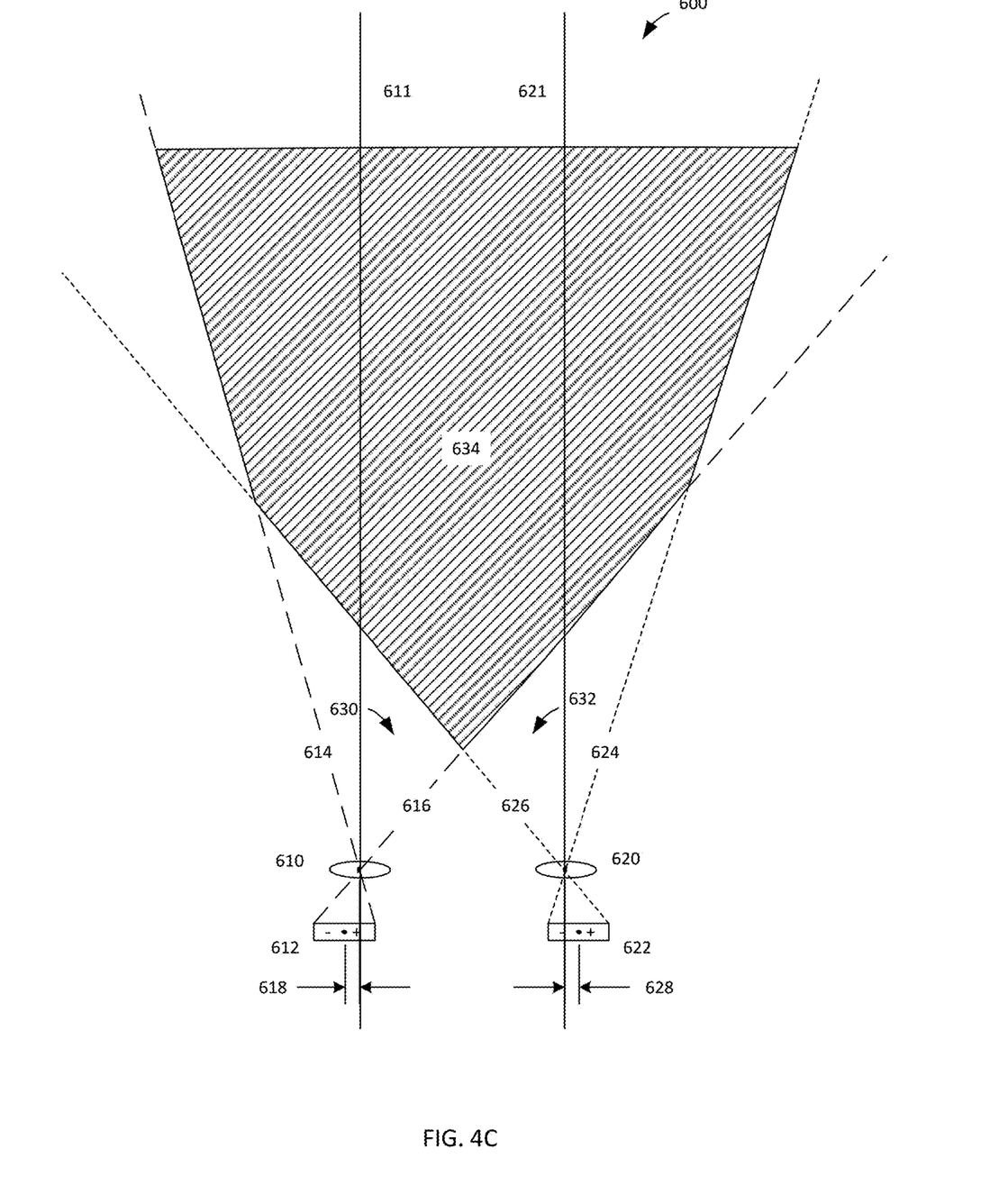
FIG. 4C depicts a third exemplary optical design according to certain aspects of the present disclosure.

FIG. 4C depicts a third exemplary optical design according to certain aspects of the present disclosure. In system 600, the sensors 618, 628 are offset outward by distances 618, 628, respectively, from the OAs 611, 621 that pass through the centers of lenses 610, 620. In certain embodiments, the sensitive surfaces of sensors 612, 622 are parallel. In certain embodiments, the sensitive surfaces of sensors 612, 622 are coplanar. The lines 614, 616 define the paths of rays that will strike the outer edges of sensor 612 and therefore define FOV 630. Similarly, lines 624, 626 define the paths of rays that will strike the outer edges of sensor 622 and therefore define FOV 632. The area of overlap of FOVs 630, 632 define the working area 634 of system 600. The area 634 is wider in the front, i.e. the edge towards the sensors 618, 628, and closer to the sensors 618, 628 than the equivalent area of system 500, i.e. without the offset of sensors 618, 628. The shape of work area 634 is much more useful than the triangular work area 130 of FIG. 3. Although there is a loss of coverage of the outer, rear corners of work area 634, this is generally not useful space in workcells.

Figure 5A:
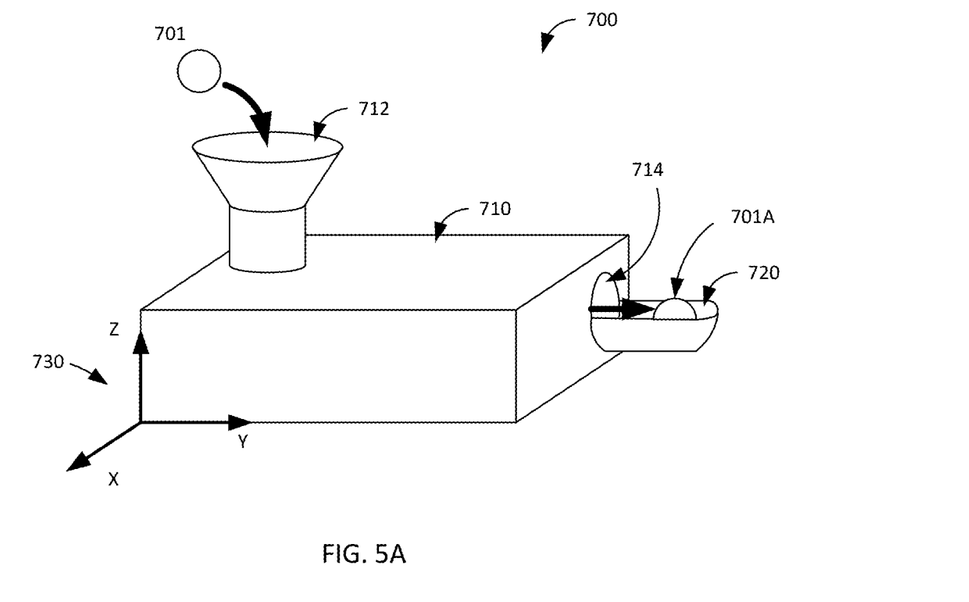
FIGS. 5A-5B depict an exemplary fixture and its associated spatial envelope according to certain aspects of the present disclosure.
Figure 5B:
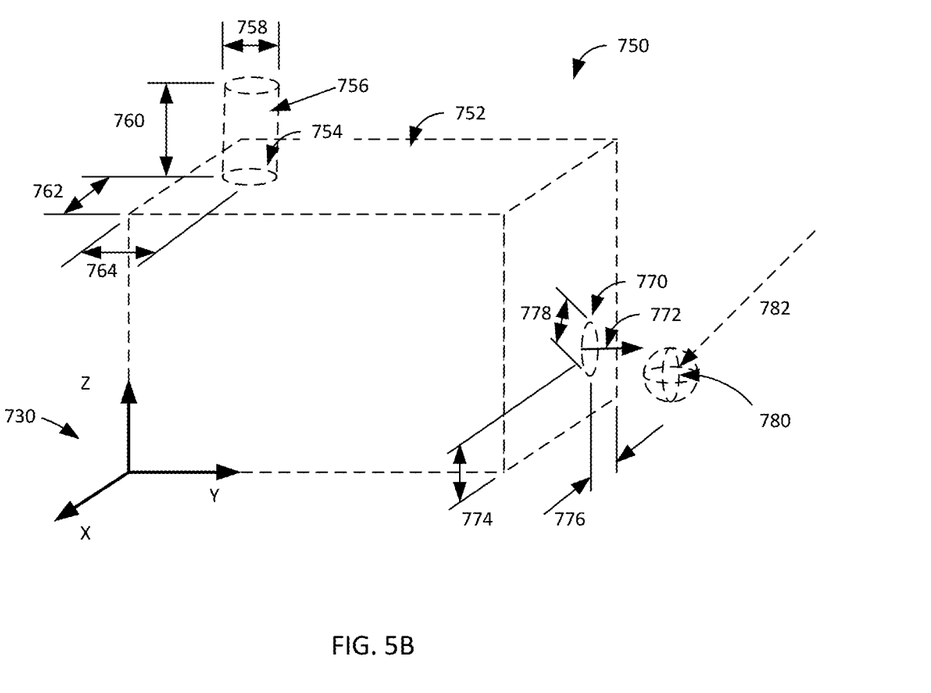

FIGS. 5A-5B depict an exemplary fixture 700 and its associated spatial envelope 750 according to certain aspects of the present disclosure. Fixture 700 is a simplistic device, where a ball 701 is dropped into a funnel 712, passes into the body 710 of the fixture 700 and is processed in some fashion, then exits through aperture 714 into a trough 720 and stops in position 701A. A coordinate system 730 with three orthogonal axes X, Y, Z is defined for the fixture 700. In certain embodiments, coordinate system 730 is also used to define the 3D positions of fiducials (not shown in FIG. 5A). If this fixture 700 were part of a robotic workcell, it would be desirable to have the robot drop the balls 701 into the funnel 712 and then remove the processed balls from location 701A.

FIG. 5B depicts a spatial envelop 750 that is defined to genericize the interface of fixtures to a robot module, such as the robot module 200 of FIG. 1. First, a "keep-out" zone is defined in coordinate system 730 that encompasses the fixture 700. This serves dual purposes, in that acceptance of a fixture may include a comparison to this envelope 752, which would be provided to the fixture supplier in the procurement specifications, to ensure that the fixture is as designed. Secondly, the processor that is controlling a robot arm, for example the robot arm 220 of FIG. 1, can compare the position of the end effector or other points on the arm to the volume of the keep-out zone and adjust the robot arm position and path to avoid entering the keep-out zone. The coordinates of the corners of the keep-out zone are defined in the coordinate system 730 and are included in the information stored in the memory of fixture 700. The keep-out zone need not be a rectilinear solid and may have any form and include curves, protrusions, and cavities. These coordinates and characteristics of the keep-out zone may be downloaded, for example by the processor of electronics module 400 of FIG. 1, and passed to the processor controlling the robot arm 220.

The example envelope 750 also defines interaction points, e.g. an "input location" and an "output location" on the surface of the keep-out zones, as guidance for use of the fixture 700, for example by robot module 200. In this example, the input location is defined in two exemplary ways. First, a circular opening 754 is defined on the surface of the keep-out zone where the robot arm is to place an unprocessed ball 701. The planar input location 754 is defined by location references 762, 764 to the coordinate system 730 and diameter 758. In some embodiments, the input location is defined as a volume 756, wherein the robot arm is to place the ball 701 at any point within this volume 756 and then release the ball 701. The volume 756 is defined by location references 762, 764 to the coordinate system 730 as well as the height 760 and diameter 758 of the volume 756.

The output location is also shown in two exemplary ways. First, a circular exit 770 is defined on the surface of the keep-out zone 752 and located by locations references 774, 776 and diameter 778. An exit vector 772 is also defined to indicate the direction of motion of the ball 701 when it passes through the exit 770. A second example of defining an output location is the final location 780, which indicates the position 701A from FIG. 5A where the ball 701 will come to a stop. In some embodiments, an approach vector 782 is defined to indicate from what direction the end effector should approach the location 780. The information about the characteristics of the input and output locations is also included in the information stored in the memory of fixture 700 and may be downloaded with the other information.

Other types of interaction points may be defined as appropriate for the purpose of the workcell and types of parts to be handled in the work cell. For example, multiple holding locations may be defined on a tray, each location designated as an interaction point. Interaction points may depend on the status or content of a module, for example a tray may have a first set of interaction points for a first layer of parts that rest directly on the tray and a second set of interaction points for a second layer of parts that is stacked upon the first layer of parts and are only usable when the first layer of parts is in place. A tool may have loading and unloading interaction points, or a single interaction point that is both a loading and unloading location.

Defining the keep-out zone and input and output locations and vectors enables this information to be downloaded from the fixture 700 to a processor in the workcell that controls the robot arm so as to automate the programming of the robot arm to interact with fixture 700. The information contained in the memory of fixture 700 comprises the 3D location of the fiducials, the characteristics of the keep-out zone, and the characteristics of the input and output locations and approach vectors as well as other information such as a fixture model, serial number, dates of manufacture or latest service, or any other fixture-related data. In certain embodiments, this information is stored in a defined data structure that is common to all fixtures. In certain embodiments, the information is provided as data pairs, the first data item being a data identifier for a particular parameter and the second data item being the value or values of that parameter. In certain embodiments, data may be stored according to any style of storage that enables retrieval and identification of the data elements in the memory.

One of the advantages of providing information about the fixture in this generic way is that generic commands are sufficient to instruct the robot on how to interact with the fixture. For example, a command "place item in input location" is enough, when combined with the information from the fixture that defines the location of the fixture relative to the robot arm, the position of the input location, and the vector to be use to approach the input location, to cause the robot to place the item (which it presumably picked up in a previous step) in the desired input location of the fixture. This simplifies the programming and avoids having to program the workcell as to the precise location of the input location for this set-up.

In some embodiments, the characteristics of a single type of fixture are stored as data set in a library that is available, for example, to the processor of electronics module 400. This library may be resident in the memory of electronics module 400, in the memory of robot module 200, on a remote memory accessible by the processor of electronics module 400 over a network, or in any other storage location or medium where information can be stored and retrieved. Each data set will have a unique identifier that is also stored in the memories of modules of that type of fixture. The processor need only retrieve the identifier from a fixture, and retrieve the data set associated with that type of fixture from the library. Retrieval of the identifier may be by scanning a machine-readable code such as a barcode, observing a machine-readable code by one of the optical systems of camera module 100 and parsing that portion of the image, scanning a Radio Frequency Identification (RFID) device, or through interaction with a processor or other electronic device over a wired or wireless communication link. In some embodiments, the library is available on a central server, for example a cloud-based data server, to which the processor can be communicatively coupled. In certain embodiments, the library is downloaded to a memory of the electronics module 400 and periodically updated as new fixtures are released. In certain embodiments, the library is stored on the computer 500 of FIG. 1.

A module 700 may have only output locations. For example, a tray of parts may be provided to the work cell. In some embodiments, the tray may have a barcode label printed in a location visible to the camera module 100. The memory of the electronics module 400 may include information about the size, shape, fiducial locations, and interaction points of the tray. After the position of the tray is determined by the system 10 and the information regarding access points and locations is transferred to the processor 270, the processor 270 can then direct the robot arm 220 to remove parts from the tray. When the tray is empty, as will be known by the processor 270 after it has interacted with each of the interaction points of the tray, e.g. removed a part from each of the interaction points, the workcell 10 can signal for a new tray of parts to be provided, for example by sending a signal to another system to remove the empty tray and provide a new tray with parts.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but is to be accorded the full scope consistent with the language claims.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference without limiting their orientation in other frames of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A method of determining a position and orientation of an object having a plurality of fiducials attached thereto, comprising the steps of:
    forming images of the plurality of fiducials on a sensitive surface of a sensor;
    determining a 2D location of each of the images of the plurality of fiducials on the sensitive surface;
    associating each 2D location with a 3D position of the same fiducial in a first coordinate system of the object; and
    determining a first position and a first orientation of the object with respect to the sensitive surface of the sensor based in part on the 2D locations and the 3D positions.

2. The method of claim 1, wherein:
    the sensor comprises a second coordinate system;
    the sensitive surface has a second position and second orientation in the second coordinate system; and
    the step of determining the first position and the first orientation of the object comprises determining a third position and a third orientation of the first coordinate system in the second coordinate system.

3. The method of claim 1, wherein:
    at least one of the plurality of fiducials alternates between a first state and a second state; and
    the step of determining the 2D location comprises determining the 2D position of the at least one of the plurality of fiducials while in the first state while the other fiducials are not in the first state.

4. The method of claim 3, wherein: each of the plurality of fiducials alternates sequentially in the first state while the remaining fiducials are in the second state; and the step of determining the 2D location comprises determining the 2D location of each fiducial while in the first state.

5. The method of claim 3, wherein:
the at least one of the plurality of fiducials emits light when in the first state and does not emit light when in the second state; and
the plurality of fiducials are sequentially and individually in the first state.

6. The method of claim 1, wherein at least one of the plurality of fiducials emits light having at least one of a predetermined wavelength and a predetermined modulation frequency.

7. The method of claim 1, wherein the sensor is one of an imaging detector and a position sensitive detector (PSD).

8. The method of claim 1, wherein:
the method is described by machine-readable instructions stored on a non-volatile memory.

9. The method of claim 1, wherein:
the method is executed on a processor that is communicatively coupled to the memory after the instructions are loaded into the processor.

10. A system for determining a position and orientation of an object having a plurality of fiducials attached thereto, the system comprising: a processor configured to receive images of the plurality of fiducials; and a memory comprising instructions that, when loaded into the processor and executed, cause the processor to: receive from a camera system, images of a portion of the plurality of fiducials; determine a 2D location of each of the portion of the plurality of fiducials based in part on the received images; retrieve information comprising 3D positions of the portion of the plurality of fiducials in a first coordinate system of the object; associate each 2D location with the 3D position of the respective fiducial; and determine a first position and a first orientation of the object with respect to a sensitive surface of the sensor based in part on the 2D locations and the 3D positions.

* * * * *